UNITED STATES PATENT OFFICE.

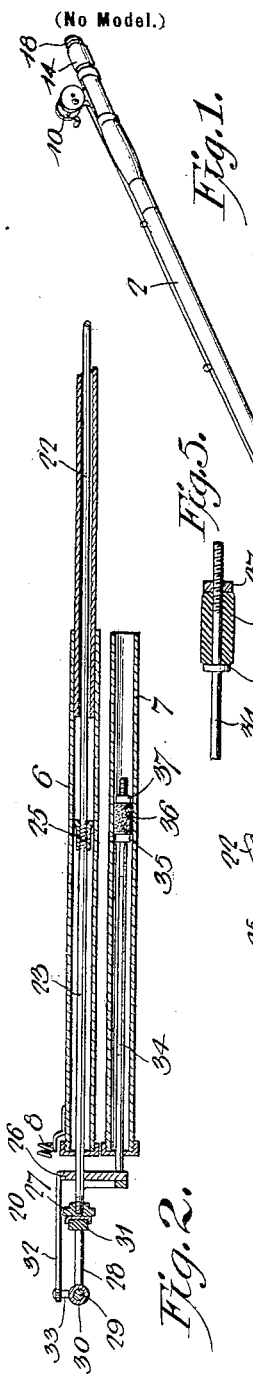

FREDERICK J. DITCHEY, OF MIDDLEPORT, PENNSYLVANIA.

FISHING-POLE ATTACHMENT.

SPECIFICATION forming part of Letters Patent No. 655,363, dated August 7, 1900.

Application filed April 19, 1900. Serial No. 13,520. (No model.)

*To all whom it may concern:*

Be it known that I, FREDERICK J. DITCHEY, a citizen of the United States, residing at Middleport, in the county of Schuylkill and State of Pennsylvania, have invented a new and useful Fishing-Pole Attachment, of which the following is a specification.

This invention relates to a fishing-pole attachment, and has special reference to devices for fishing for trout or like fish of a game or sly nature.

The main object of the invention is to provide a simple and effective mechanism which will permit a fisherman or angler to insert a pole through small openings in bushes or brush and project the line into the water without fear of being detected, and thus render it easy to fish along streams that are obstructed by bushes or thick growth, and also allow the pole and line to be readily carried through close places without catching or difficulty to the fisherman, and have the line always in readiness for immediate use.

Another object of the invention is to provide mechanism fully under the control of the fisherman or angler for playing out the line gradually by a step-by-step movement or permit a full run to play the fish, and also to have the attachment so assembled that it can be easily removed and stored and permit the pole to be used alone in an ordinary manner for open-water fishing, and also to have the mechanism of a light and durable nature and add but little weight to the pole.

With these and other objects in view the invention consists in the construction and arrangement of the several parts, which will be more fully hereinafter described and claimed.

In the drawings, Figure 1 is a perspective view of a fishing-pole, showing the improved attachment. Fig. 2 is an enlarged sectional view of the tip-section of the pole, showing the improvement applied thereto. Fig. 3 is an enlarged longitudinal section of the butt broken through and the intermediate joint in part, showing other features of the improvement. Fig. 4 is an enlarged detail perspective view of the line-feed regulator and parts coacting therewith. Fig. 5 is a detail sectional view of a connecting-joint for a portion of the device. Fig. 6 is a detail perspective view of the intermediate joint of the pole, showing the ordinary tip-joint in position to be applied thereto. Fig. 7 is a transverse vertical section on the line 7 7, Fig. 3.

Similar numerals of reference are employed to indicate corresponding parts in the several views.

The numeral 1 designates a fishing-pole which in the present instance is in three joints, including the butt-joint 2, an intermediate joint 3, and a tip joint or section 4, the latter carrying the main features of the improvement. In addition to the tip-section 4, which is removable at will, the pole includes a regular tip-joint 5, adapted to be slipped into the outer extremity of the intermediate section or joint 3 in the usual manner to arrange the pole for open-water fishing. The joint or section 4 embodies two tubular lengths 6 and 7, secured to each other, the length 6 being fitted on the intermediate joint 3, as shown, and the length 7 normally standing thereunder. On the outer end of the length 6 a split guide-eye 8 is fixed, and on suitable portions of the butt and intermediate joints are other ordinary guides 9 for obvious reasons or to hold the line in regular position relatively to a reel 10.

Within the front extremity of the butt-joint 2 a center guide 11 is secured, and consists of an eye 12, with radial holding-arms 13, fixed to diametrically-opposite portions of the said joint. On the rear end of the butt-joint a combined closing-sleeve and support 14 is removably applied, and has front internal screw-threads 15 to fit over the rear end of said butt-joint, and is also formed with rear internal screw-threads 16 and a supporting-web 17 in advance of the latter and provided with a central opening in alinement with the eye 12. The rear threads 16 removably receive an adjusting-cap 18, to which is secured the rear end of an operating-wire 19, slidable longitudinally through all the joints and designed to actuate a line-feed regulator 20 at the front extremity of the joint or section 4. The said operating-wire is movable through the eye 12 and made up of three sections 21, 22, and 23, the sections 21 and 22 being connected by a screw-socket coupling 24, and the front end of the section 22 is attached to the rear end of the section 23 by a screw-threaded coupling 25, which is located in the tubular length 6 and is diametrically large enough to center the latter section, so that all the sections may be joined or disconnected at will and be held in proper relation in the several joints of the rod. The front portion of the section 23 extends through and has sliding movement in the upper central part of an inner support 26 of the line-feed regulator 20, and is detachably connected at its front terminal to the center of a slide 27, having loose movement at its opposite ends on parallel bearing-rods 28, projecting from the support 26 and preferably in the form of a yoke having its inner continuous extremity bent at an angle and secured to the support 26. The outer ends of the bearing-rods 28 are connected by a cross-rod 29, and thereon is fitted a friction tube or buffer 30, preferably formed of rubber. To the front side of the slide 27 a yielding or rubber friction-cushion 31 is also secured and coacts with the said friction tube or buffer to grip and hold the fishing-line which passes between said parts in a manner which will be presently explained. Projecting forwardly from the support 26, above and parallel with the bearing-rods 28, are side guards 32, having their outer ends secured to upright pins 33, fastened to and rising from the outer extremities of the bearing-rods 28 and serve to prevent the line from feeding over or contacting with the said bearing-rods, and thereby always maintain it in proper position for engagement by the cushion 31 and buffer 30 and obviate catching of the same in the movable part or slide 27 at the points of bearing thereof.

The rear lower central portion of the support 26 has a piston-rod 34 fastened thereto and extends back into the lower tubular length 7, and on the rear extremity is a fixed collar 35, against which one end of a tubular piston 36 has bearing and is loose on the portion of the rod 34. This piston is made adjustable by a nut 37, bearing against the rear extremity thereof and operable on the rear screw-threaded terminal 38 of the said piston-rod. By this means a friction-controller for the regulator is provided to prevent too-loose movement of the said regulator, and when it is desired to increase the friction the nut 37 is turned up against the rear end of the piston 36 to diametrically bulge the latter. This friction attachment acts as a stay for the support 26 to hold it with sufficient resistance against movement to permit the slide 27 to be operated at times without disturbing the position of the said support. The said friction attachment also prevents the parts from having a rattling or noisy movement to avoid frightening the fish, and care will be taken in the entire construction of the improvement to have the parts all so arranged that loose movement thereof will be prevented.

When the line-feed-regulating device is unnecessary and when using the pole in open-water fishing, the tubular lengths 6 and 7 are detached from the outer end of the joint 3 by first uncoupling the wire section 23 from the section 22, when said regulator can then be disposed in the pocket or any usual fishing accouterment and the tip-joint 5 substituted therefor. When the tip-joint is not in use or if the several wire sections are disjointed and out of service, they may all be stored in the butt-joint 2 and held against rattling or movement by any well-known form of buffer or sound-deadener located in said joint and which is an obvious expedient to attain the result sought. It is also proposed to increase the thickness of the screw-threaded ends of the several wire sections where the screw-threads are formed to avoid weakening the said ends.

When the regulator is in use, the line is arranged as shown in Fig. 1 and passes down between the buffer 30 and the cushion 31, and by pushing the operating-wire forward by means of the cap 18 the line is caught and held between the buffer 30 and cushion 31. By exerting a continuous pushing force on the operating-wire the support 26 is moved away from the tubular lengths against the resistance set up by the friction attachment set forth, and the line is thereby pulled from the reel, and by a retracting operation of the same parts the cushion and slide carrying the same are drawn to the rear until the support is engaged by the slide and likewise moved inward or restored to normal position. Successive operations of this character in a quick and quiet manner will result in a rapid feed out of the line and permit the extremity carrying the hook to be dropped or lowered into a small water opening or clearance, and also in the first instance the line before feeding the same will support the hook or hooks and other tackle close to the regulator and permit the latter to be inserted through a small opening in bushes or growth skirting or adjacent a stream. Moreover, the fisherman will be permitted to approach the stream closely and fish from behind a bush or other growth without being seen or producing shadows on the water, and which is a great advantage in trout-fishing. It is a well-known fact that the trout under the most favorable fishing circumstances is a hard fish to catch, and particularly if he has once struck and escaped, and also that the favorite haunt of the trout is in streams thickly guarded by shore growths; but the improved attachment permits a quiet and unobserved approach with beneficial results. If it is desired to permit the fish to run or have play after he has struck, the slide 27 is drawn back and the reel thrown open for this purpose until enough slack has been allowed, when an immediate check is established by quick movement of slide and cushion 31 toward and in gripping relation to the buffer 30, and after the fish is played out the grip on the line is released and the reel operated to draw in the same and the fish therewith.

Numerous other advantages will appear from time to time in the use of the device set forth and all parts will be made light, strong, and durable and can be easily put together and taken apart. When it is desired to firmly hold the regulator in fixed gripping and immovable position, the cap on the rear extremity of the operating-rod is caused to engage the adjacent sleeve, and thereby permit the device as an entirety to be easily carried through thickets and other growths or permit the line to be set while fishing.

Though the preferred form of the several parts of the attachment have been shown and described, it will be understood that when necessary changes in the form, proportions, size, and minor details of construction may be resorted to without in the least departing from the nature or principle of the invention.

Having thus described the invention, what is claimed as new is—

1. In a fishing-pole attachment, the combination with a fishing-pole, of a reel thereon, a line-feed regulator on the outer end of the pole, and a separably-jointed operating device extending through the pole and connected to said regulator.

2. In a fishing attachment, the combination with tubular pole-joints, a line-feed regulator removably applied to the outer end of the pole, and an operating wire rod extending through the said tubular joints and made up of separable sections.

3. In a fishing-pole attachment, the combination with a fishing-pole, of a reel thereon, a line-feed regulator on the outer end of the pole, friction means for controlling the movement of said regulator, and means for operating the regulator.

4. In a fishing-pole attachment, the combination with a fishing-pole, of a line-reel thereon, a slidable line-feed regulator on the outer end of the pole having gripping devices, and means for operating the regulator.

5. In a fishing-pole attachment, the combination with a fishing-pole, of a reciprocable line-feeding regulator on the outer extremity thereof.

6. In a fishing-pole attachment, the combination with a fishing-pole, of a reciprocable line-feeding regulator on the outer end thereof, and a friction-piston connected to the said regulator.

7. In a fishing-pole attachment, the combination with a fishing-pole, of a reciprocable line-feeding regulator on the outer end thereof having line-gripping means, a portion of the latter being adjustable independently of the entire regulator, and means for operating the entire device.

8. In a fishing-pole attachment, the combination with a fishing-pole, of a reciprocable line-feeding regulator on the outer end thereof, the latter including flexible gripping means, and side guards, means for controlling the freedom of movement of the said regulator, and means for operating the same.

In testimony that I claim the foregoing as my own I have hereto affixed my signature in the presence of two witnesses.

FREDERICK J. DITCHEY.

Witnesses:
CHAS. W. BANKER,
FREDK. H. JOHN.